(12) United States Patent
Hwu (10) Patent No.: US 7,767,961 B2
(45) Date of Patent: Aug. 3, 2010

(54) METHOD FOR DETERMINING MATERIAL INTERFACIAL AND METROLOGY INFORMATION OF A SAMPLE USING ATOMIC FORCE MICROSCOPY

(75) Inventor: Justin Jai-Jen Hwu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 578 days.

(21) Appl. No.: 11/149,789

(22) Filed: Jun. 9, 2005

(65) Prior Publication Data
US 2006/0289749 A1 Dec. 28, 2006

(51) Int. Cl.
*G01N 13/16* (2006.01)
(52) U.S. Cl. .................. 250/307; 250/310; 73/105
(58) Field of Classification Search ............ 250/307
See application file for complete search history.

(56) References Cited

U.S. PATENT DOCUMENTS

| | | | | |
|---|---|---|---|---|
| H000993 | H | 11/1991 | Sartore | 250/307 |
| 5,196,701 | A | 3/1993 | Foster et al. | 250/306 |
| 5,283,442 | A | 2/1994 | Martin et al. | 250/561 |
| 5,414,260 | A | 5/1995 | Takimoto et al. | 250/306 |
| 5,440,920 | A | 8/1995 | Jung et al. | 73/105 |
| 5,528,033 | A | 6/1996 | Lo et al. | 250/307 |
| 5,798,525 | A * | 8/1998 | Benizri-Carl et al. | 250/310 |
| 5,866,806 | A | 2/1999 | Samsavar et al. | 73/105 |
| 6,185,323 | B1 * | 2/2001 | Archie et al. | 382/145 |
| 6,339,955 | B1 | 1/2002 | Phan et al. | 73/105 |
| 6,417,673 | B1 | 7/2002 | Kleiman et al. | 324/537 |
| 6,489,611 | B1 * | 12/2002 | Aumond et al. | 250/306 |
| 6,535,201 | B1 * | 3/2003 | Cooper et al. | 345/173 |
| 6,566,655 | B1 | 5/2003 | Choo et al. | 250/310 |
| 6,627,887 | B1 | 9/2003 | Dudley et al. | 250/310 |
| 6,930,308 | B1 * | 8/2005 | Lorusso et al. | 250/310 |
| 2003/0101013 | A1 * | 5/2003 | Solecky et al. | 702/85 |
| 2003/0108235 | A1 | 6/2003 | Hayes | 382/145 |

FOREIGN PATENT DOCUMENTS

JP 09-251026 9/1997

OTHER PUBLICATIONS

European Search Report from application No. 06114112.3-1528 which was mailed on Apr. 19, 2007.
Griffith et al., "Dimensional metrology with scanning probe microscopes" American Institute of Physics 1993.

* cited by examiner

*Primary Examiner*—David A. Vanore
*Assistant Examiner*—Phillip A. Johnston
(74) *Attorney, Agent, or Firm*—Zilka-Kotab, PC (57) ABSTRACT

A method for determining interfacial information and critical dimensions of a sample using atomic force microscopy. Tip-specimen deconvolution is performed on the scan lines before the critical dimension information processing. Local maxima and minima or local slope change of each scan line are found on a plurality of scan lines. A best fit line is then found for the plurality of maxim and minima or slope change points. Two best fit lines may be found using a plurality of maxima or minima or slope change points. An intersection of the two best fit lines can be used to determine a critical dimension such as a transition point. Such a method may be used to determine a track width of a trapezoidal magnetic write head or may be used to determine the location of a flare point on a magnetic write head.

5 Claims, 7 Drawing Sheets

METHOD FOR DETERMINING MATERIAL INTERFACIAL AND METROLOGY INFORMATION OF A SAMPLE USING ATOMIC FORCE MICROSCOPY

FIELD OF THE INVENTION

The present invention relates to atomic force microscopy (AFM) and more particularly to a method for using atomic force microscopy to determine the location of a material interface on a sample, and to determine critical dimensions on a sample.

BACKGROUND OF THE INVENTION

Atomic force microscopy (AFM) probes are often used to evaluate and measure features on a semiconductor or other product having very small dimensional or topographical features. Such products, which are typically formed on wafers, may also include magnetic read write heads such as those formed on a wafer of, for example, titanium carbide. AFM provides valuable metrology information during manufacture or development of such devices, in a manner that is substantially non-destructive to the device being manufactured. Conventional AFM probes typically include a silicon cantilever beam with a silicon tip (AFM tip extending perpendicular to or at a slight angle (e.g., few to 10 degrees) relative to the cantilever beam. The tip is often formed into a long and thin rod. The silicon tip is often etched to form a sharp apex small enough to fit into a deep feature. There are several high aspect ratio tips on the market made for imaging and measuring deep narrow features. Some high aspect ratio tips are made using a focused ion beam to machine the silicon tip into a long thin rod with an aspect ratio between 7:1 and 10:1. Hence, an AFM tip with a 10:1 aspect ratio (i.e., length:diameter) may be able to reach 1000 nm into a 100 nm diameter trench. Other high aspect ratio tips may be formed using electron beam deposition (e.g., EBBD tips) or may be carbon nanotubes with a diameter between 10 nm and 80 nm, for example.

Other AFM devices, such as Critical Dimension Atomic Force Microscopy (CDAFM), are designed for critical dimension information. This type of AFM device is equipped with a tip having a bulbous or expanded tip portion which is capable of profiling topographies having negative slopes (i.e., features with overhanging portions or negative sidewall profiles). With such a device, the bulbous portion of the AFM tip can extend under the overhanging portion of the topography. Profile chasing algorithms enabling tip to follow local topographical variation and algorithms for tip-profile deconvolution after scans are features in this AFM category for revealing critical metrology information of such overhanging or negatively sloped structure.

Although AFM provides a convenient, non-destructive means for determining a great deal of metrology or topographical information about a sample, the variety of information that can be provided by such a technique has been limited. For example, when a structure is constructed of multiple layers, AFM has not been able to determine the location of the interfaces between the different material layers. In addition, AFM scans, which provide a series of two dimensional profile plots have not been able to provide detailed critical dimension information in many circumstances. Such critical dimensions may include a maximum width location of a structure in three dimensions, or an exact transition point on a structure where the structure changes from one shape to another through local slope transition at the layer interface.

Typically, when such information has been needed, AFM techniques have had to be combined with other destructive testing techniques such as focused ion beam milling, wafer cleave experiments, or etching to expose the cross section. Understandably, such techniques add considerable time and expense to the manufacturing process.

Therefore, there is a strong felt need for a convenient, non-destructive testing technique that can provide material interfacial data and critical dimension information. Such a technique would preferably incur little added manufacturing expense, and would preferably employ existing testing techniques such as AFM, while still providing the necessary critical dimension and interfacial information.

SUMMARY OF THE INVENTION

The present invention provides a method and system for finding critical metrology and profile transition data for a sample using a profile scan of the sample. The method includes performing a scan of the sample, the scan including a plurality of scan lines. A location of a local maxima or minima or local slope change is then determined for a plurality of the scan lines, and critical dimension information is determined from the local maximum or minimum.

The scan may be produced by atomic force microscopy (AFM) and the local maximum or minimum information may be in the form of a local bump, dip, change of slope in the scanned profile or other anomaly in the scan line. The critical information obtained from the local maximum or minimum may include interfacial information, such as the location of a material interface on the sample, or may include other critical dimension information such as the location of a transition point on the sample or other feature.

A best fit line may be obtained from found local maxima or minima from a plurality of scan lines in order to form an accurate three dimensional representation of the critical dimension information such as interfacial or other information. In addition, two or more best fit lines may be determined from the plurality of local maxima or minima and an intersection (or best fit intersection) of the two or more best fit lines can be determined to obtain a location of a critical dimension.

The method described above provides a fast, non-destructive, relatively inexpensive means for testing a sample to determine necessary critical dimension. This eliminates the need, in many cases, to perform time consuming testing techniques such as focused ion beam milling or cleave experiment, which cuts a sample to view the various material layers and determine critical dimensions. The present invention, therefore, greatly increases product throughput while maintaining high product quality.

These and other advantages and features of the present invention will be apparent upon reading the following detailed description in conjunction with the Figures.

BRIEF DESCRIPTION OF THE DRAWINGS

For a full understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
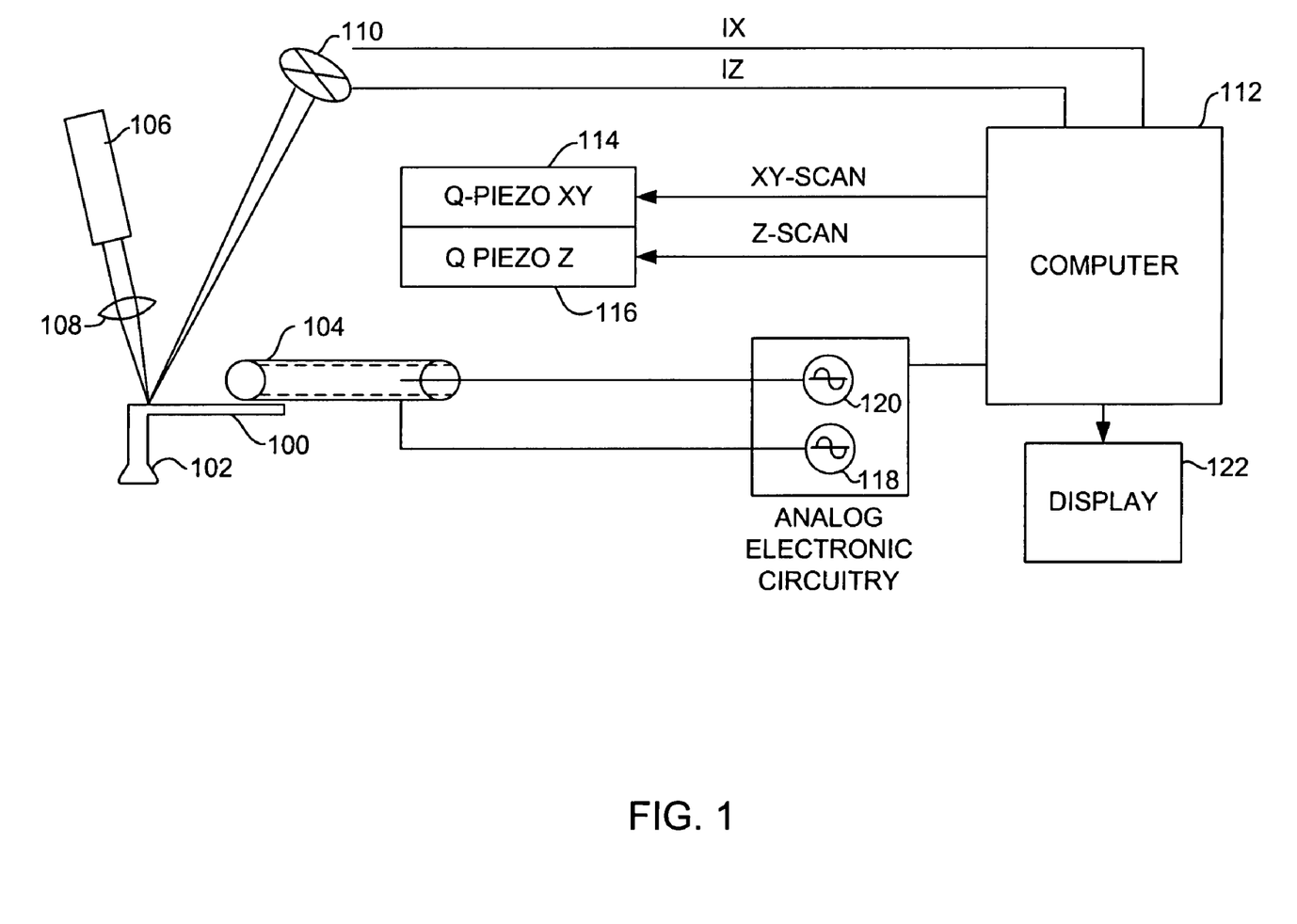
FIG. 1 is a schematic illustration of a system for scanning a sample.

Referring now to FIG. 1, there is shown a schematic illustration of an atomic force microscope (AFM) with which the present invention might be employed. The particular AFM is, of course, for purposes of illustration and the present invention should not be limited to a specific AFM system or to AFM systems in general. A cantilever 100 with a tip 102 is coupled to a fast xyz piezoelectric tube scanner 104 for rapidly and accurately controlling the position of the tip 102 in 3-axial directions. A laser 106 transmits a laser beam through a collimator lens 108 onto the back of the cantilever 100 where the beam is reflected to a two dimensional displacement sensor. Preferably, the two-dimensional displacement sensor includes a quadrant photodetector. Alternatively two-dimensional displacement sensors may comprise piezoresistive cantilever, capacitive inductive, tunneling, optical or interferometrical devices. The photodetector 110 accurately detects the displacement and orientation of the cantilever and hence the tip and it provides signal IX and IZ indicative of the force on the tip in the scan direction (x) and in the vertical direction (z) respectively. The amplitude and sign of these signals are received and recorded by a computer 112.

The tip 102 position is determined responsive to scan signals from computer 112 to xy-piezoelectric 114 for scanning the tip in a plane parallel to the top surface of the sample and to z-piezoelectric 116 for depth or z plane directional displacement.

In addition to the scan motion provided in response to the signals from computer 112, the tip can be made to vibrate in Z-axis direction at a high frequency, greater than 1 khs, preferably in a range between 1 and 100 khz, at an amplitude of several angstroms, typically 10 Angstroms at a frequency of 10 khz, by virtue of a signal from oscillator 118 to the piezoelectric tube scanner 104.

The tip 102 can also be made to undergo vibratory motion about is nominal position in the x axis direction at a high frequency, also greater than 1 khz, typically in the range between 1 and 100 khz, but at a different frequency than that in Z-axis direction. The x-axis motion is at an amplitude of several angstroms, typically 10 Angstroms at a frequency of 15 khz. The x-axis vibratory motion is provided by virtue of a signal from oscillator 120 to the piezoelectric tube scanner 104.

Additional electronic circuitry which is part of the photodetector circuitry (not shown) converts the photodetector currents into the proper IX and IZ signals as is known in the art. The signals IX and IZ from the photodetector are received and recorded by computer 112. The ratio of IX to IZ represents the local slope of the sample at the point in contact with the tip 102. The profile of the sample is displayed on a display 122, which is responsive to signals provided by computer 112.

On a horizontal surface, the amplitude of IZ is maximum and the amplitude of IX is substantially zero because the cantilever is not undergoing any twist or torsion motion in the x-axis or scan direction. On a vertical surface, the IX signal is a maximum and the IZ signal is a minimum. Moreover, the sign of the IX signal is indicative of whether the slope of the surface is upward or downward. Also, the phase of the IX signal is in phase with the x-piezoelectric excitation signal or is 180 degrees out of phase with the x-piezoelectric excitation signal, depending upon the slope of the surface. The average tip-to-sample spacing is obtained from the magnitude of the square of the IX signal and IZ signal amplitudes. Based upon the known average tip-to-sample spacing and the local sample slope at a given point, the computer is able to move the tip in the appropriate direction in order to follow the sample and to maintain contact with the sample, without interruption of the scan motion.

Figure 2:
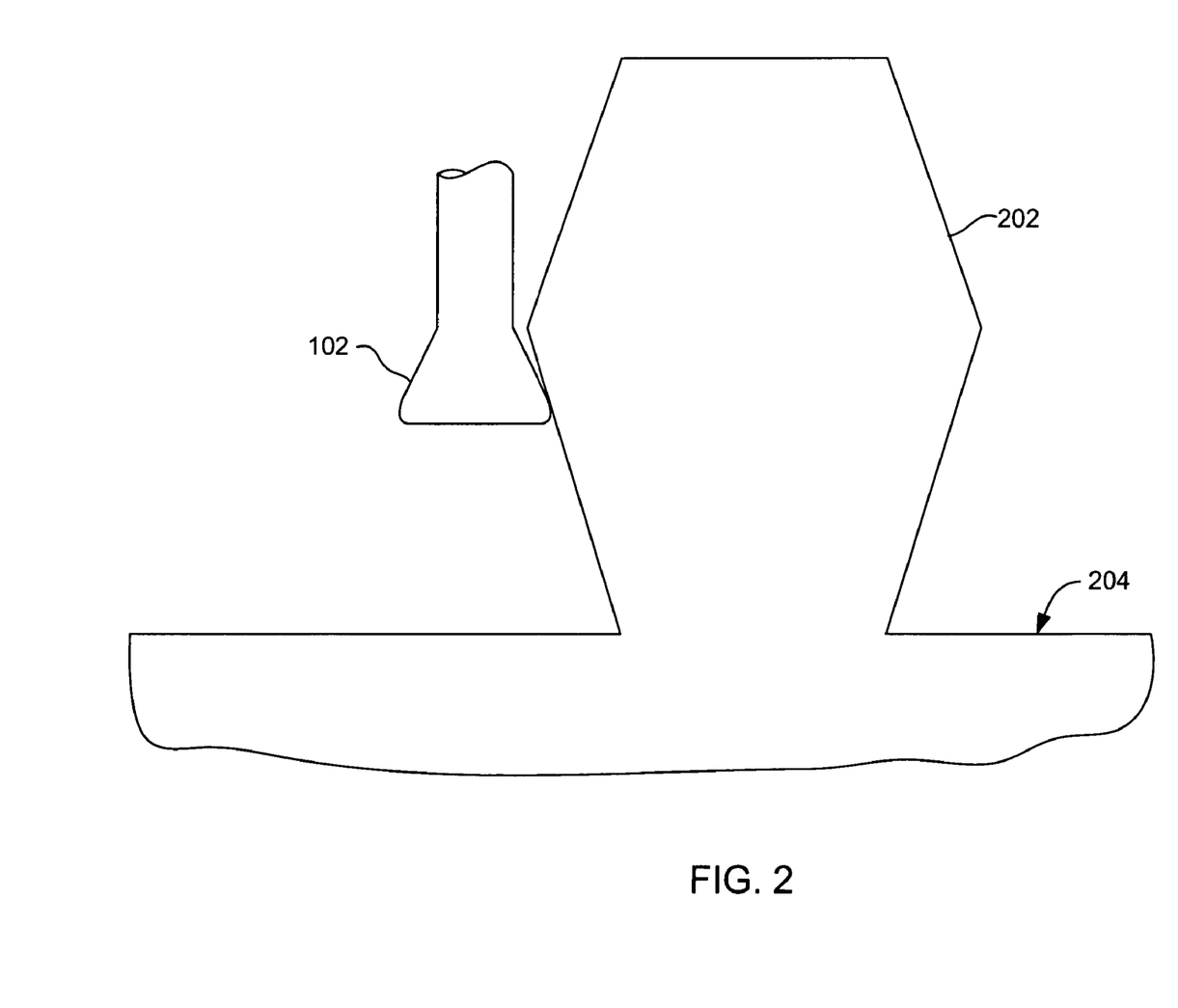
FIG. 2 is a view of an atomic force microscope probe scanning a sample with topography.

It will be apparent to those skilled in the art that the arrangement shown in FIG. 2 is readily modifiable for operation in a D.C. mode (i.e. without oscillatory excitation). Since the tip does not undergo any vibratory motion, the oscillators 118, 120 are eliminated. The photodetector circuitry is then modified since the laser beam reflected from the cantilever does not contain a high frequency component and hence, signal processing for obtaining the signals IX and IZ is simplified.

With reference now to FIG. 2, a sample mode of contact between the tip 102 and a topographical feature 202 of a sample 204 is illustrated. As discussed above, the tip 102 may be configured with a bulbous end (such as in a Critical Dimension Atomic Force Microscopy system (CDAFM)) so that it may extend under overhanging features to indicate a feature having a negative slope, such as the bottom half of the feature 202. A deconvolution algorithm can be used to interpret the data from such overhanging features. With the topographical feature 202 as merely an example of any number of features shapes that can be scanned, it can be seen that a feature of interest may be a local slope change 206. A maximum 208 or minimum 210 may also be found. In the example shown, the maximum width 208 is at the same location as the local slope change 206. However, other shapes could be scanned such as a shape having a local slope change that is not a maximum or minimum, a shape that has no maximum or minimum, or a shape in which the maximum or minimum are at the top and bottom but which has no local slope change. Therefore, the present invention should not be limited by any means to the shapes disclosed.

Figure 3:
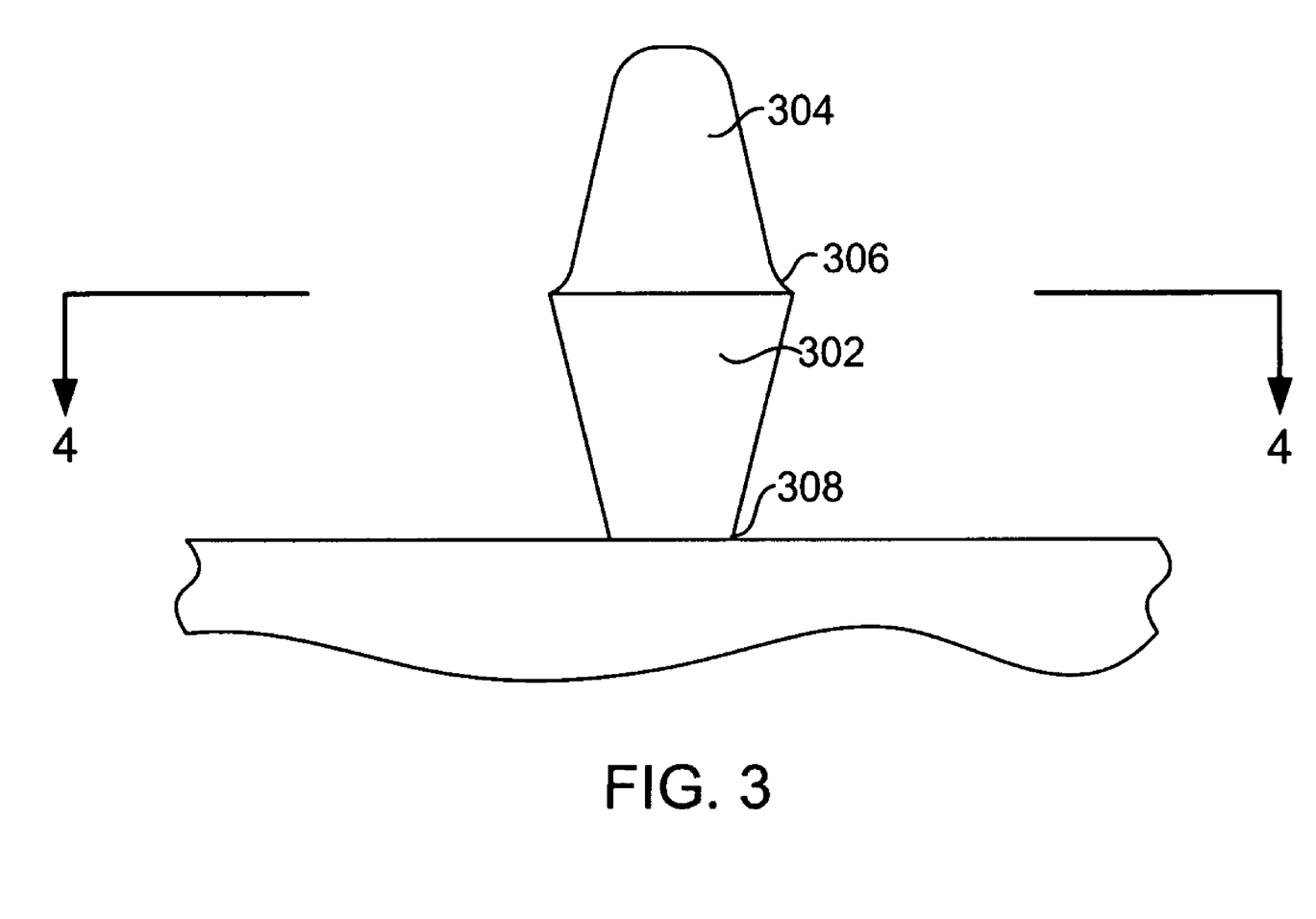
FIG. 3 is a cross section view of a magnetic write pole in an intermediate stage of manufacture.
Figure 4:
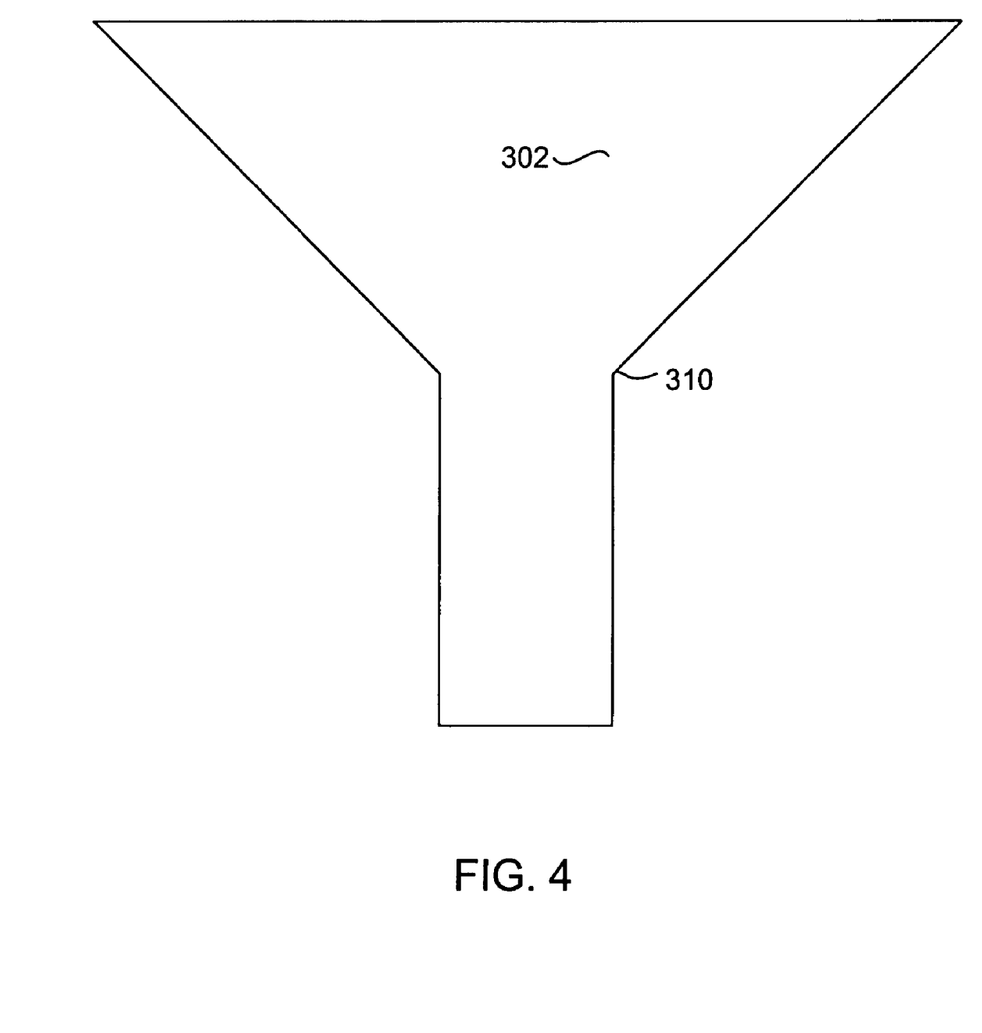
FIG. 4 is a view taken from line 4-4 of FIG. 3.

With reference to FIGS. 3 and 4, the present invention will be described in terms of a scan performed on a write pole for a magnetic data recording device such as a disk drive. However, it should be understood that the present invention can be practiced on any variety of structures and should not be limited to samples that include magnetic write heads. Therefore, FIG. 3 shows an end view (air bearing surface view or ABS view) of a write head in an intermediate stage of manufacture. The view shows a trapezoidal write pole 302. A mask structure 304, such as one that includes a layer of photoresist or mask of other materials, may be provided on top of the write pole. The write pole 302 has certain critical dimensions. For example, as shown in FIG. 3, the write pole has a maximum width 306 at its top, which is also the location of the interface between the write pole 302 and the mask layer 304. The maximum width at the top 306 of the write pole 302 is critical, because it determines the final width of the write pole 302.

Another critical dimension that can be seen in FIG. 3 is the minimum width at the bottom 308. With reference to FIG. 4, which shows a top down view of a section of a write pole, it can be seen that the write pole 302 has a pole tip portion with a substantially constant cross section, and then has a portion that flares outward. The point at which the write pole 302 transitions from the substantially constant cross section to the flared portion is called the flare point 310. This flair point 310 location is another critical information point, since its distance from the air bearing surface (ABS), i.e. a plan location where the final pole is cut to face the magnetic disk, is an important design point.

As mentioned above, atomic force microscopy provides only topographical information. To obtain material information, such as the locations of interfaces between materials, it has previously been necessary to perform destructive testing procedures such as cross sectioning a sample using a focused ion beam (FIB) or performing a cleave experiment. We have recognized, however, that because different materials react at different rates to various manufacturing procedures, such as ion milling processes which have milling selectivity between mask and pole materials and thus shape the writer pole layer into reentrant profiles. Certain clues as to the location of material interfaces can be detected in the surface topography. Using an appropriate data interpretation algorithm an image can be produced that indicates the location of material interfaces as well as certain critical dimensions as discussed.

Figure 5:
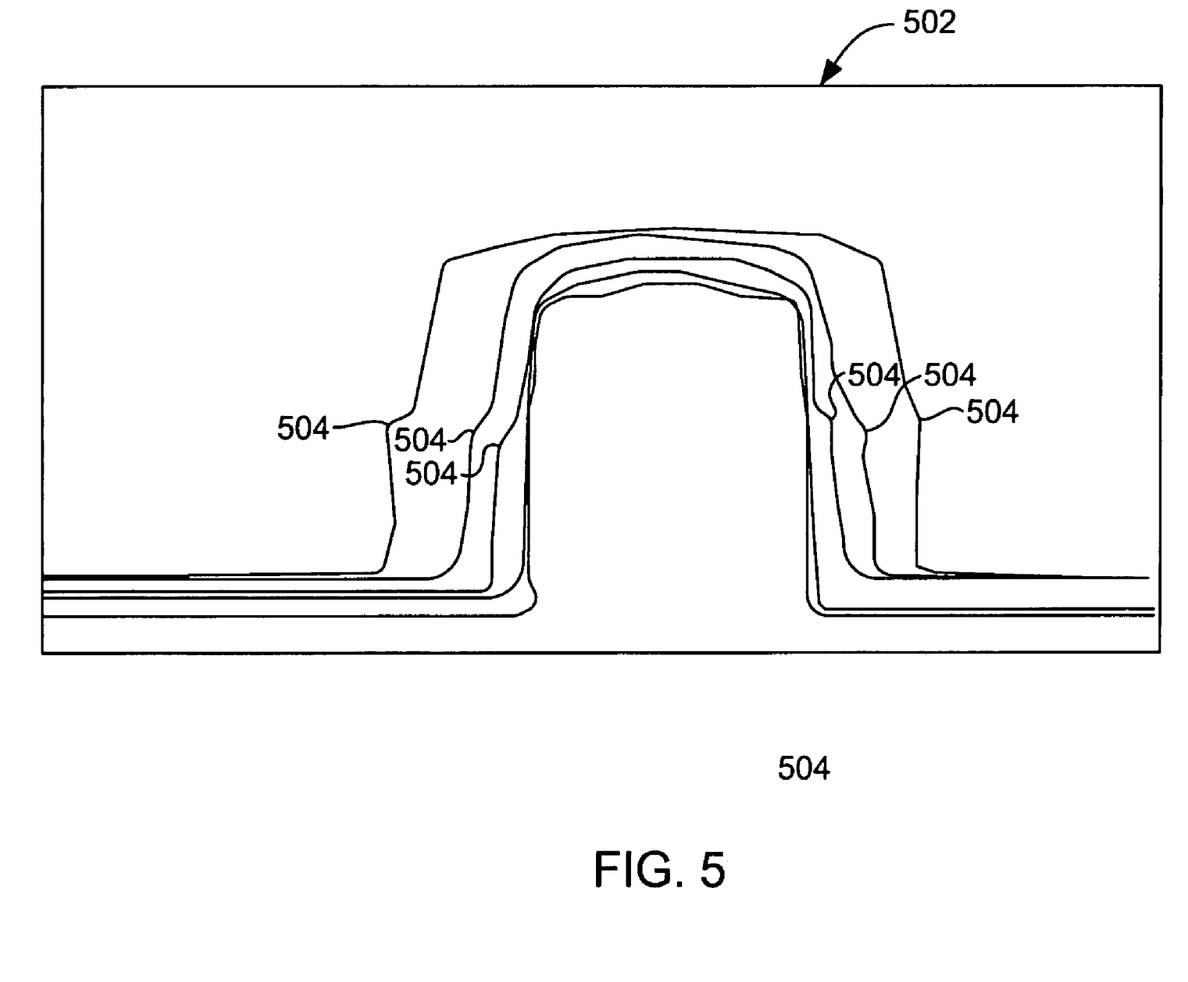
FIG. 5 is a graphical representation of a superposition of scan lines of a sample depicted in FIG. 4.
Figure 6:
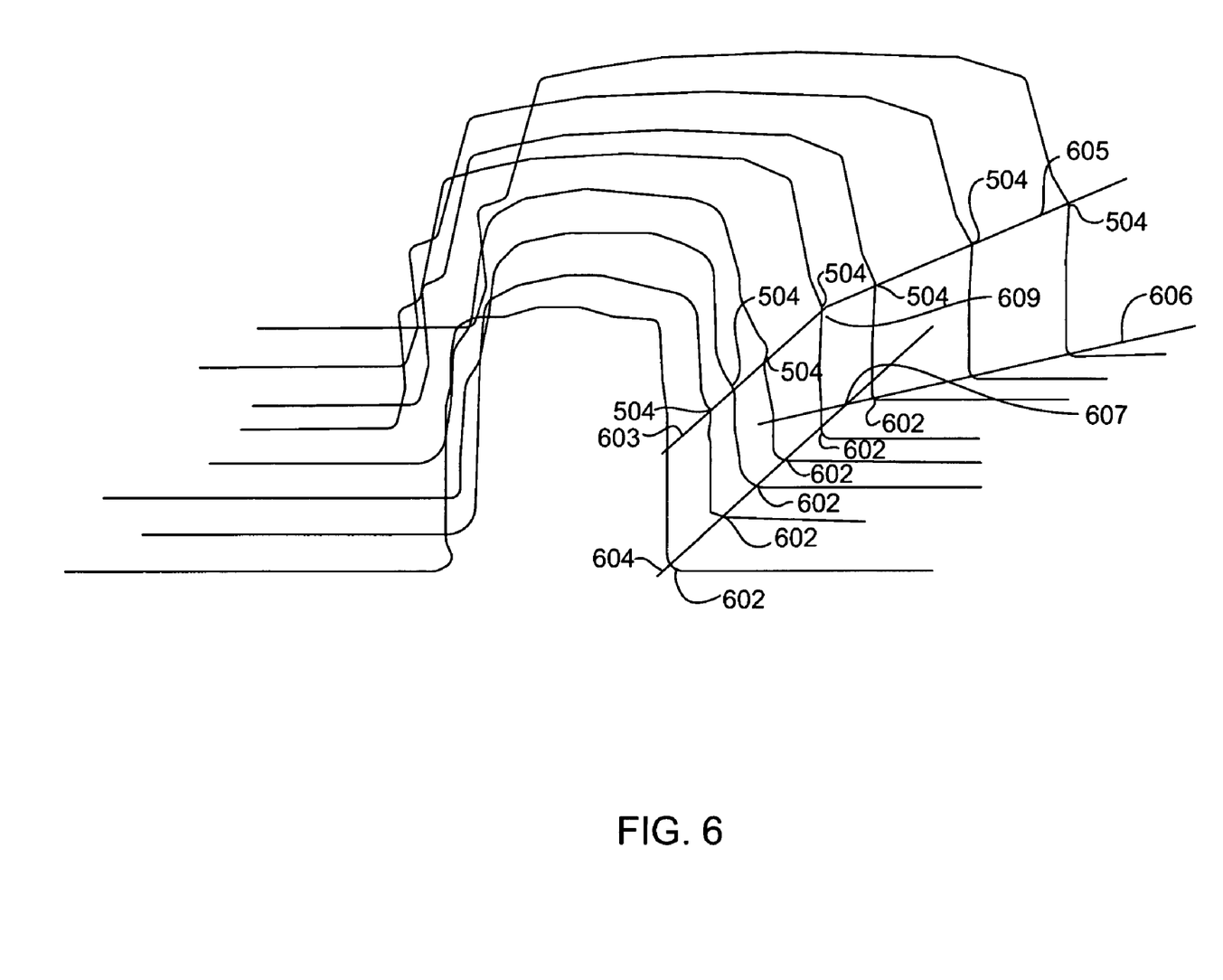
FIG. 6 is a three dimensional representation of scan lines according to an embodiment of the invention showing best fit lines determined from a plurality of local maxima and minima.

With reference now to FIG. 5, graph 502 shows a superposition of a plurality of scan lines of the write pole 302, as viewed from the ABS. FIG. 6 shows a perspective view of the scan lines of a plurality of scan lines. In FIG. 5 it can be seen that many of the scan lines have an anomaly such as a bump or local slope change 504 on each side of the pole 302. Each of these anomolies 504 indicate a location of the interface between the pole 302 and the overlying mask layer 304 described in FIG. 3. This also represents the location of the local maximum width portion 306 at the top of the pole 302 for that particular profile scan.

When a structure, such as a write pole is formed, different material layers making up the structure react at different rates to various processes. In the present example, the structure as described with reference to FIG. 3 includes a write pole 302 and also an overlying mask structure 306. When the pole 302 is formed, a material removal process such as ion milling is used to remove pole material not covered by the mask. However, the mask material is removed at a different rate than the magnetic material making up the pole. This results in a change in the profile of the structure at the location 306 of the interface between the pole 302 and mask 304. Therefore, this interface manifests itself as bumps or local slope changes 504 in the scan shown in FIG. 5.

With reference now to FIG. 6, an isometric view of the scan lines can be seen. As discussed above, with regard to our example of a magnetic write pole, certain critical dimensions include the local maximum width of the write pole and the location of the flare point 310 (FIGS. 3 and 4). In order to determine these critical dimensions from an AFM scan such as the one shown in FIG. 6, certain critical points on each profile line must first be determined. For example, the bumps or local slope change point 504 discussed earlier can be found on each profile and a best fit line 603 can be found using these bumps in order to more accurately determine a top width of the write pole 302. In order to better determine the location of the maximum width 306 of the pole 302, a line fitting algorithm can be applied to the plurality of scans.

Also as discussed, another critical information point is the location of flair point 310 (FIG. 4). With reference to FIG. 6, a point 602 on each profile can be determined that represents the bottom of the write pole along the constant cross section portion as well as along the flared portion. A first best fit line 604 can be connected with the points 602 that lie within the constant cross section area of the scan. A second best fit line 606 can then be found that connects the points 602 that lie within the flared portion of the write pole. An intersection 608 of the lines 604, 606 can then be found. This intersection 608 accurately represents the location of the bottom flare point 310 of the write pole 302. A similar exercise leads to the top flare location, the intersection 609, after the line fitting of 603 and 605 in the plane of mask-pole interface. This top flare pint 609 is a very critical dimension. It should be pointed out that the first and second best fit lines should intersect if the feature is constructed on a planar surface. However, for situations where the lines don't intercept, the intersection points 608 and 609 can be found as the best approximation of an intersection of the two lines. Such an approximation could be for example a half way point along the shortest possible line connecting the first and second best fit lines. This could be, for example at a location where the lines overlap one another, when crossing one another.

It should be pointed out that the construction of best fit lines has only been illustrated for one side of the scanned structure. This is, however, for the purposes of clarity only, and it should be understood that the line fitting procedure could be performed for both sides of the structure. It should also be pointed out that although the invention has been described in terms of a scan of a write pole for magnetic recording, the present invention applies to any number of other sample types, such as semiconductor circuits produced on a Si wafer.

Figure 7:
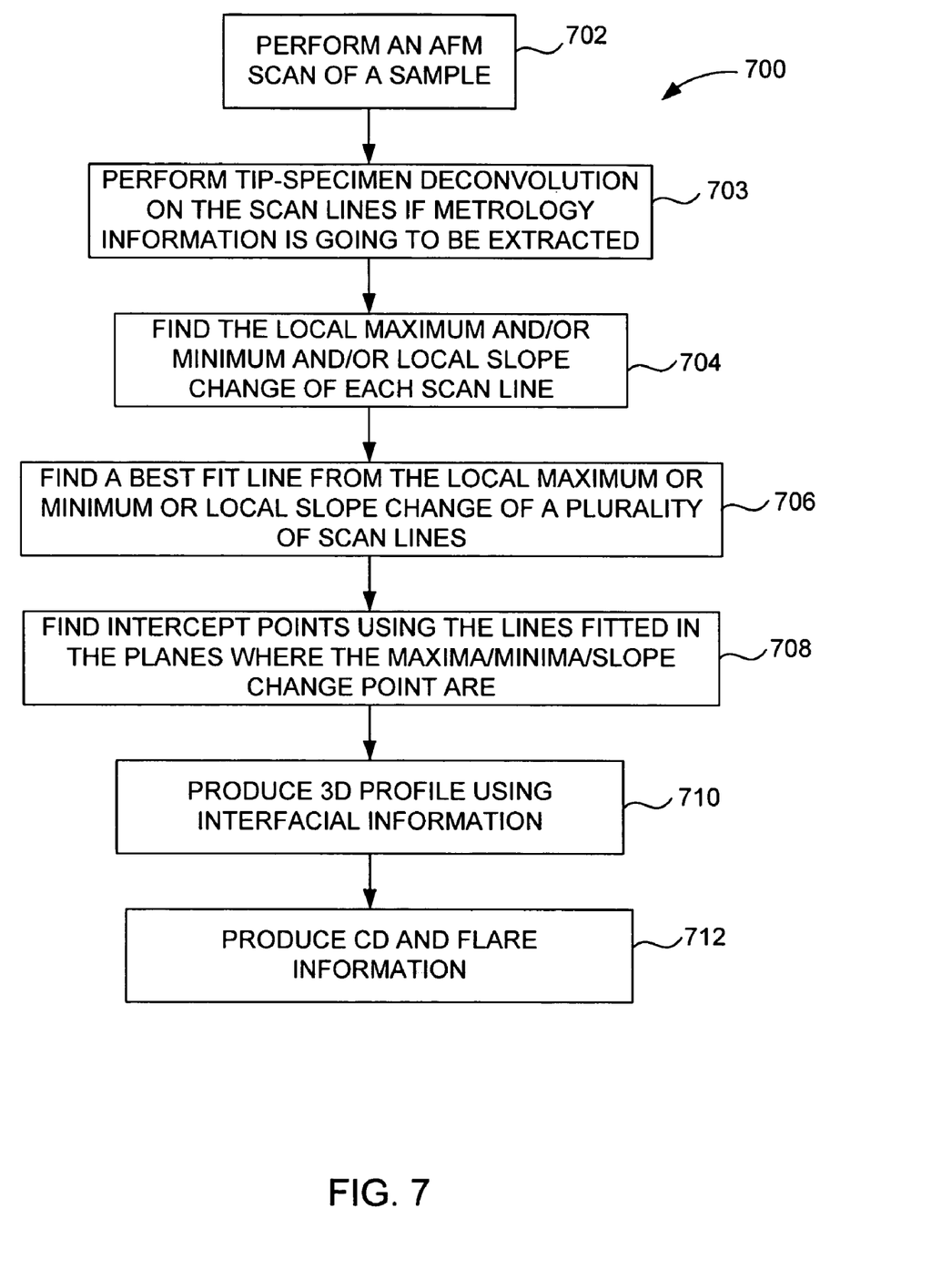
FIG. 7 is a flow chart illustrating a method for determining a critical dimension from a scan of a sample.

FIG. 7 illustrates a method 700 for determining a critical dimension from an AFM scan of a sample. First, in a step 702 a scan of the sample is performed. The scan includes a plurality of profile scan lines. Then, in a step 703 a tip-specimen deconvolution algorithm for Critical Dimension Atomic force Microscopy (CDAFM) is performed to reveal the true feature profile if retrieving critical dimension information is the final goal. This step 703 can be employed if metrology information is going to be extracted. Then, in a step 704, a local maximum or minimum location or location of a local slope change is found in each of the scan lines obtained in step 702. The local maximum or minimum location or the slope change locations may be in the form of bumps or anomalies 504 or 602 in the scan lines, as discussed above. Then, in a step 706 one or more best fit lines are found from the local maxima or minima or slope changing points of each scan line. In an optional step 708, if two substantially intersecting best fit lines are found, a location of the intersection is found. The intersection points can be found using the lines fitted in the planes where the maxima, minima, or slope changing locations are. In a step 710 a three dimensional profile of the sample including interfacial information can be from the scan lines, best fit lines and intersection points if applicable. Finally, in a step 712 critical dimension (CD) and flare point information are produced.

While various embodiments have been described above, it should be understood that they have been presented by way of example only, and not limitation. For example, although the invention has been described in terms of atomic force microscopy, the invention could be practiced using other scanning techniques such as, but not limited to the use of scanning tunneling microscopy, etc. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A computer program, embodied on a computer readable medium, the program comprising, computer readable instructions for:
 performing a scan of magnetic write pole, the scan including a plurality of scan lines;
 performing a tip-sample deconvolution of the scan lines;
 finding a local maxima or minima or slope change on four or more of the plurality of scan lines;
 finding a first best fit line based on a first set of the maxima or minima or slope change;
 finding a second best fit line based on a second set of the maxima or minima or slope change;
 finding an intersection of the first and second best fit lines; and
 determining interfacial information from the local maxima or minima or local slope change, the interfacial information indicating the location of an interface between different material of the sample.

2. A computer program as in claim 1 wherein the instructions for performing a scan of the write pole include instructions for using an atomic force microscope to perform a scan of the write pole.

3. A computer program as in claim 1 further comprising, instructions for producing a graphical model of the write pole, the graphical model including the critical dimension.

4. A computer program as in claim 1 further comprising, instructions for determining interfacial information from the local maxima and minima or local slope change and instructions for producing a graphical model of the write pole sample, the graphical model including interfacial information corresponding to the location of a trailing edge of the write pole.

5. A computer program as in claim 1 wherein the write pole comprises a magnetic write pole and a mask structure formed over the magnetic write pole, and wherein the interfacial information includes the location of an interface between the magnetic write pole and the mask structure.

* * * * *